(12) United States Patent
Peterson

(10) Patent No.: US 7,427,003 B1
(45) Date of Patent: Sep. 23, 2008

(54) DISK FEEDER AND UNSTACKER

(75) Inventor: Keith R. Peterson, Burnsville, MN (US)

(73) Assignee: Condre, Inc., Eden Prairie, MN (US)

( * ) Notice: Subject to any disclaimer, the term of this patent is extended or adjusted under 35 U.S.C. 154(b) by 280 days.

(21) Appl. No.: 11/140,711

(22) Filed: May 31, 2005

(51) Int. Cl.
  *B65G 59/00* (2006.01)
  *B65G 59/06* (2006.01)
  *B65H 1/30* (2006.01)

(52) U.S. Cl. ............... 221/274; 221/281; 414/795.7; 414/797.9

(58) Field of Classification Search ............ 414/797.9; 221/92, 241, 242, 268, 270, 274, 287, 281; 241/34
  See application file for complete search history.

(56) References Cited

U.S. PATENT DOCUMENTS

| | | | | |
|---|---|---|---|---|
| 2,353,474 A | * | 7/1944 | William | 271/35 |
| 2,509,467 A | * | 5/1950 | Anderson, Jr. | 53/154 |
| 2,545,396 A | * | 3/1951 | Wahl | 118/230 |
| 2,780,388 A | * | 2/1957 | Stephenson | 221/44 |
| 3,958,720 A | * | 5/1976 | Anderson | 221/93 |
| 4,255,073 A | * | 3/1981 | Schottle | 414/788.7 |
| 4,314,403 A | * | 2/1982 | Sanekata | 29/730 |
| 4,665,455 A | * | 5/1987 | Mesher | 360/99.03 |
| 5,195,653 A | * | 3/1993 | Gerrans | 221/274 |
| 6,676,050 B2 | * | 1/2004 | Chang | 241/37.5 |
| 6,782,544 B2 | * | 8/2004 | Russ | 720/619 |

* cited by examiner

*Primary Examiner*—Saul J. Rodriguez
*Assistant Examiner*—Gregory W Adams
(74) *Attorney, Agent, or Firm*—Steven E. Kahm; Nikolai & Mersereau, P.A.

(57) ABSTRACT

The disk feeder removes disks from the bottom of a stack of disks by pushing them one at a time with a ram traveling back and forth under a tower holding the stack of disks. The tower has a gap at the base for allowing one disk at a time to be pushed out by the ram. The tower may be tilted to provide for a stack of disks, which rest partly on a wall of the tower to reduce the weight of the stack on the bottom disk. The workstation fed by the disk feeder can be a disk destroyer, a printer, a writer or any other disk processing device. Combinations of disk feeders and workstations can produce batches of copies of disks with labels printed on them. The disk feeder provides a low cost reliable way to feed disks to work stations.

10 Claims, 4 Drawing Sheets

DISK FEEDER AND UNSTACKER

BACKGROUND OF THE INVENTION

1. Field of the Invention

This invention relates to removing disks one at a time from a stack of disks, and more particularly to removing the bottom disk from a stack of disks and delivering the disks to a workstation for processing.

2. Description of the Related Art

In most disk handling machines such as for copying machines and disk printing machines, stacks of disks are processed by removing the top most disk from a stack of disks by a CD picker and then moving the disk to a workstation to be processed and dropping the disk into the workstation. For disk copying devices the CD picker picks the disk out of a stack of blank disks, moves the CD to a tray and drops the disk in the tray. The tray retracts into a disk copy machine and the disk is written on to make a copy. The tray ejects from the copier and the disk is exposed for the CD picker to lift the disk from the tray and place it at another workstation, such as for printing on the disk, or in a stack of copied disks.

CD pickers for lifting a disk off a stack are relatively complex and expensive devices which usually have an arm with rotates on a tower and can be raised and lowered so a disk engaging device may be employed to lift a disk from a stack move it to another position and let go of the disk. Complex controllers and disk engaging equipment must be used to pick the disk from the stack and move it to a desired location.

It is desired to have a low cost, easy to make, easy to use, robust system for removing disks from a stack of disks and delivering the disks to a workstation for processing. It is also desired to have a low cost device for removing disks from workstations and placing them in another workstation, in a stack of completed disks or in a discard bin.

SUMMARY OF THE INVENTION

The disk feeder has a housing with a top surface. A tower for holding a stack of disks is attached to the top of the housing. The top surface has a trough in which ram slides. The trough fits between two wall sections forming the tower. The ram has a cover plate over the trough, which keeps the ram inside of the trough. The ram sticks out of the trough and engages only the bottom most disk in the stack of disks in the tower. The tower has a slot at one side for allowing the ram to slide a disk out from under the stack without letting the remaining disks out. Thus one disk at a time is removed with each stroke of the ram under the stack of disks. A motor inside the housing drives the ram back and forth in the trough. Sensors under the stack of disks in the tower can be used to tell a controller in the housing if there are disks present in the tower. If the last disk has been removed from the tower the controller will shut off the motor in the disk feeder after a specified time. Other sensors can be used for measuring disk speed or jams outside of the tower. The tower can be made from two walls attached to the top of the housing, one piece on either side of the trough. The walls of the tower may be curved or bent to partially surround the disks in the stack.

The disk feeder can be used for removing disks from the bottom of a stack of disks and delivering the disks to a workstation for processing. The disk feeder has a tower comprising two walls for enclosing a stack of disks. Each wall partially encloses one side of the disks. The walls face each other and are on opposite sides of a ram, which travels between the walls to push the bottom disk out from under the stack. A workstation for receiving the disks is attached to the disk feeder adjacent the gap at the base of the tower and accepts the disk for processing. The tower may be tilted backward over the ram to reduce the weight of the stack of disks on the bottom most disk thus reducing the force needed to remove the disk from the bottom of the stack and reducing the possibility of damaging the disks by disks rubbing on each other as the bottom disk is pushed from the bottom of the stack. The walls of the tower have a space between them for allowing access to the stack of disks so that a user can easily add or remove disks from the stack by hand.

The workstation adjacent the tower may be a disk destroyer such as a pair of rollers with disk dimpling spikes on at lest one roller. The user places disks to be destroyed in the tower and the ram feeds the disks into the disk destroyer one at a time until all of the disks are destroyed. The disks emerging from the disk destroyer are discarded by falling into a discard bin.

The workstation may be a writer for writing on the disk. The writer receives disks from the disk feeder and retracts the disk into the writer to write on the disk. When the writing is completed the writer ejects and the disk which can be dropped into a disk completion bin or a disk rejection bin if there is a defective disk. The writer can be tilted or rotated or both to feed the disk to a chute leading to a tower to stack the written on disks for further processing such as printing, or to a completion bin or tower, or to a rejection bin.

The workstation may be a printer for printing on the disk. The printer receives disks from the disk feeder and retracts the disk into the printer to print on the disk. When the printing is completed the printer ejects and the disk which can be dropped into a disk completion bin by tilting the printer to the eject disk position.

A combination of two or more disk feeders and writers, with a reader can be used for making multiple copies of disks quickly. Each writer can discharge disks into the tower of a disk feeder having a printer to process batches of copies of disks by writing to the disk and then printing labels on the disks.

With the addition of a means for selecting and or downloading the materials to be written on the disks, and printed on the disks, copies of CDs and DVD's can be made at a kiosk or in a store, which sells or rents CD's or DVDs. In this manner the store need not stock any inventory, it simply makes copies on demand and delivers the disks to the customers. A kiosk can be used to sell copies of disks as selected by customers and paid for at the kiosk.

OBJECTS OF THE INVENTION

It is an object of the invention to remove a disk from the bottom of a stack of disks and present it for use at a workstation.

It is an object of the invention to remove a disk from the bottom of a stack of disks and present it for use at a workstation without damaging the disks.

It is an object of the invention to provide a device, which removes disks from a stack reliably.

It is an object of the invention to provide a low cost device, which removes disks from a stack.

It is an object of the invention to deliver processed disks to selected locations.

Other objects, advantages and novel features of the present invention will become apparent from the following description of the preferred embodiments when considered in conjunction with the accompanying drawings.

DESCRIPTION OF THE PREFERRED EMBODIMENTS

There is a need for a low cost reliable way to remove disks from a stack of disks and deliver the disks to a workstation for processing. The workstation may be a disk destroyer, a disk printer, a disk writer or some other workstation for processing a disk. The workstation then must deliver the disk to a desired location.

Figure 1:
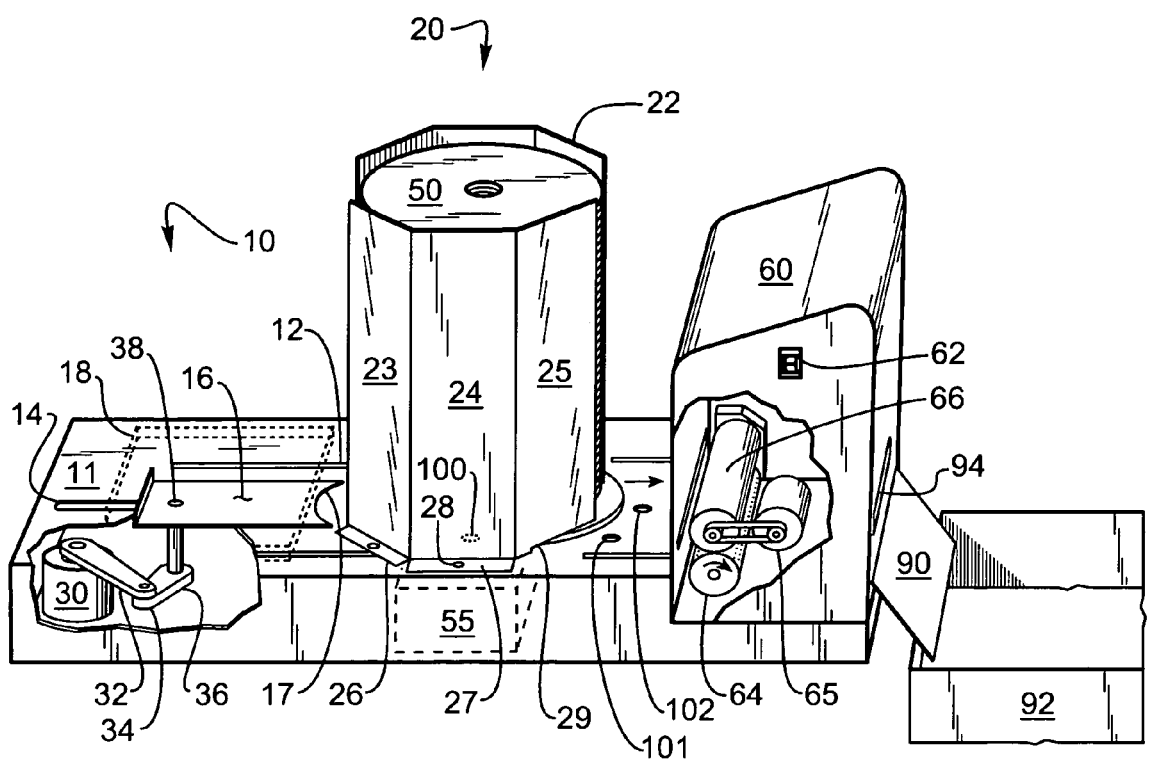
FIG. 1 is a perspective view of the disk feeder feeding disks from the bottom of a stack to a disk destroyer.

A disk feeder 10 is shown in FIG. 1 having a tower 20 formed by two opposing walls 22 each having 3 sections 23, 24 and 25. The two opposing walls 22 form a tower 20 for enclosing a stack of disks 50. The walls 22 have foot portions 26, 27 at the base of wall sections 23, 24 respectively. Each foot portion has an aperture 28 for securing the walls 22 to the top 11 of the disk feeder 10 by a fastener such as a screw, bolt or rivet. Wall sections 25 have a gap 29 at the base for allowing the bottom most disk in the stack of disks 50 to be pushed out from under the stack.

The disks 50 are pushed out from the bottom of the stack 50 by a ram 16, which slides back and forth in trough 12 in the top 11 of the disk feeder 10. The ram 16 has a cover plate 18 attached to the top 11 of the disk feeder 10 to cover it and help keep the ram 16 aligned in trough 12. The center of trough 12 has a slot 14 for guiding the ram 16. A motor 30 turns a crank arm 32 having a pivot connection 34 to driving arm 36, which has a translation nut 38 passing through the slot 14 in trough 12 connecting to ram 16 which moves the ram 16 back and forth in the trough 12.

Wall sections 23 are on either side of trough 12 allowing ram 16 to pass freely between walls 22. Ram 16 when initially totally withdrawn from underneath stack 50 will, on its forward stroke, engage the bottom disk and push it out from under the stack 50 though gap 29 in wall section 25 and out to a workstation, which in FIG. 1 is a disk destroyer 60.

Data destroyer 60 has a motor 65 for turning disk dimpling rollers 64, 66, one or both of which may be spiked, for effectively making the data on the disks unreadable by dimpling the disks 50. The disk dimpling rollers 64, 66 are placed close enough to the tower 20 such that the disks being pushed out gap 29 by ram 16 are captured between the rollers 64, 66 and moved through the disk destroyer 60 as the disks are dimpled. The rollers push the disks through the disk destroyer 60 and out a rear slot 94. The disks 50 then slide down chute 90 into discard box 92 where they are collected and disposed of.

A sensor 100 inside tower 20 detects the presence of disks to be destroyed and reports to controller 55 which will shut the motors 30 and 65 off after a specified time when no disks are detected in tower 20. Alternatively switch 62 can be used to turn the motors 30 and 65 on and off for operating the disk feeder 30 and the disk destroyer 60. Other sensors 101 and 102 can be used to tell if there is a jam in the data destroyer or the speed the disks are moving. A controller 55 monitors motors 30, 65 and sensors 100, 101, 102 for coordinating and or controlling the speed of the motors and for shutting down the system if a jam occurs.

The tower 20 may be tilted backward over the ram 16 to form tilted tower 220 in order to transfer some of the weight from the stack of disks 50 to the walls 222 of the tower. In this embodiment the first disk in the stack is flat on the top 11 of the disk feeder 10. The first few disks in the stack may have a gap 140 between the wall sections 223 of tilted tower 220 and the disks 50. After a few disks 50 are stacked in the tilted tower 220 the disks 50 want to fall over so they partially rest on the tower wall sections 223, as at 142, taking pressure off of the bottom disk 50 in the stack and allowing the bottom disk to be pushed from the bottom of the stack without scratching and damaging the bottom disk or the disk resting on top of the bottom disk. The tilted tower 220 also allows the ram 16 to operate with less force on the bottom disk 50 particularly as it approaches gap 29 in the base of tower 220 since most of the column of disks 50 are not directly over the front portion of the bottom disk as the ram 16 pushes on the rear portion of the bottom disk.

Figure 2:
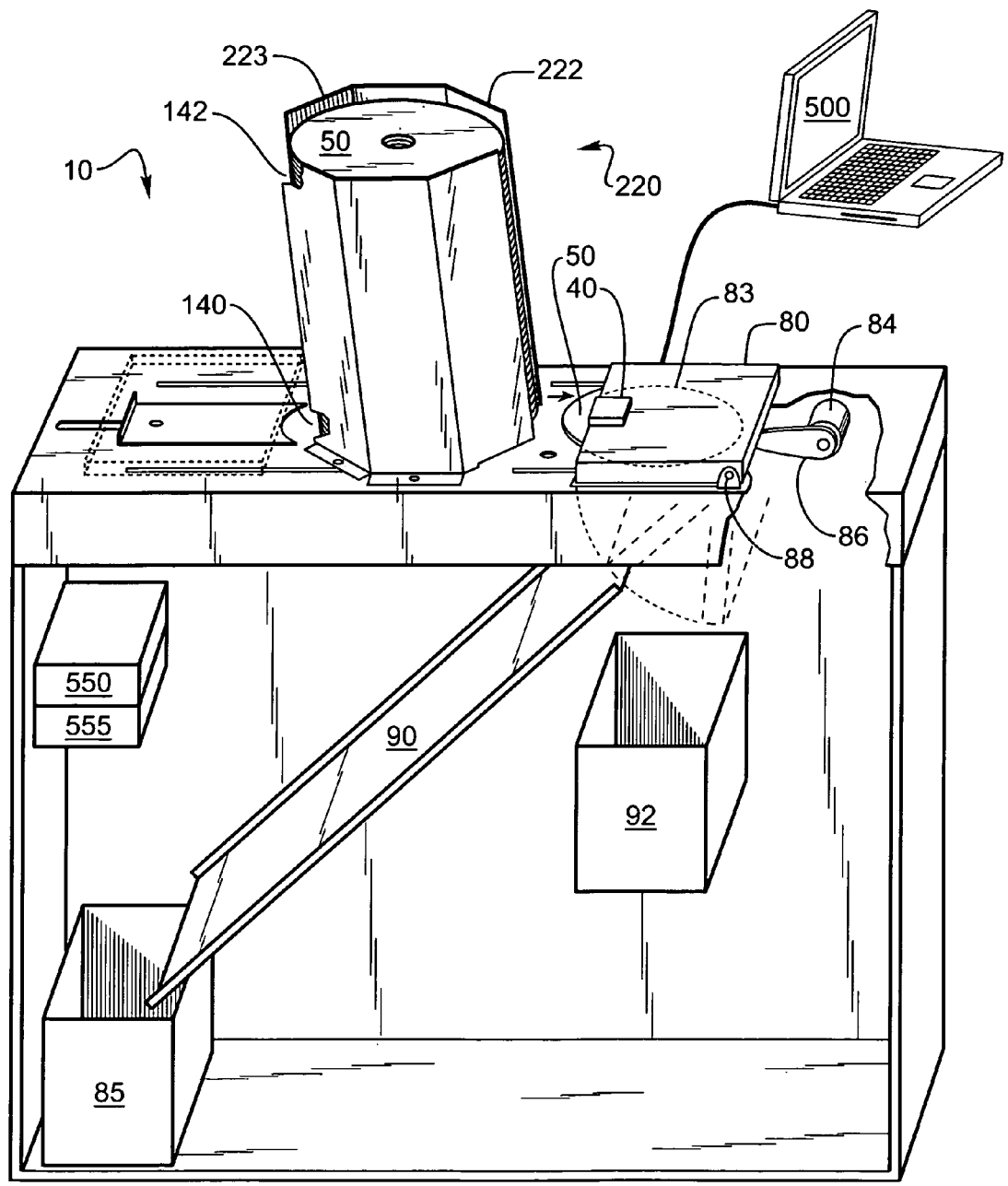
FIG. 2 is a perspective view of the disk feeder feeding disks from the bottom of a stack to a disk writer or a printer.
Figure 3:
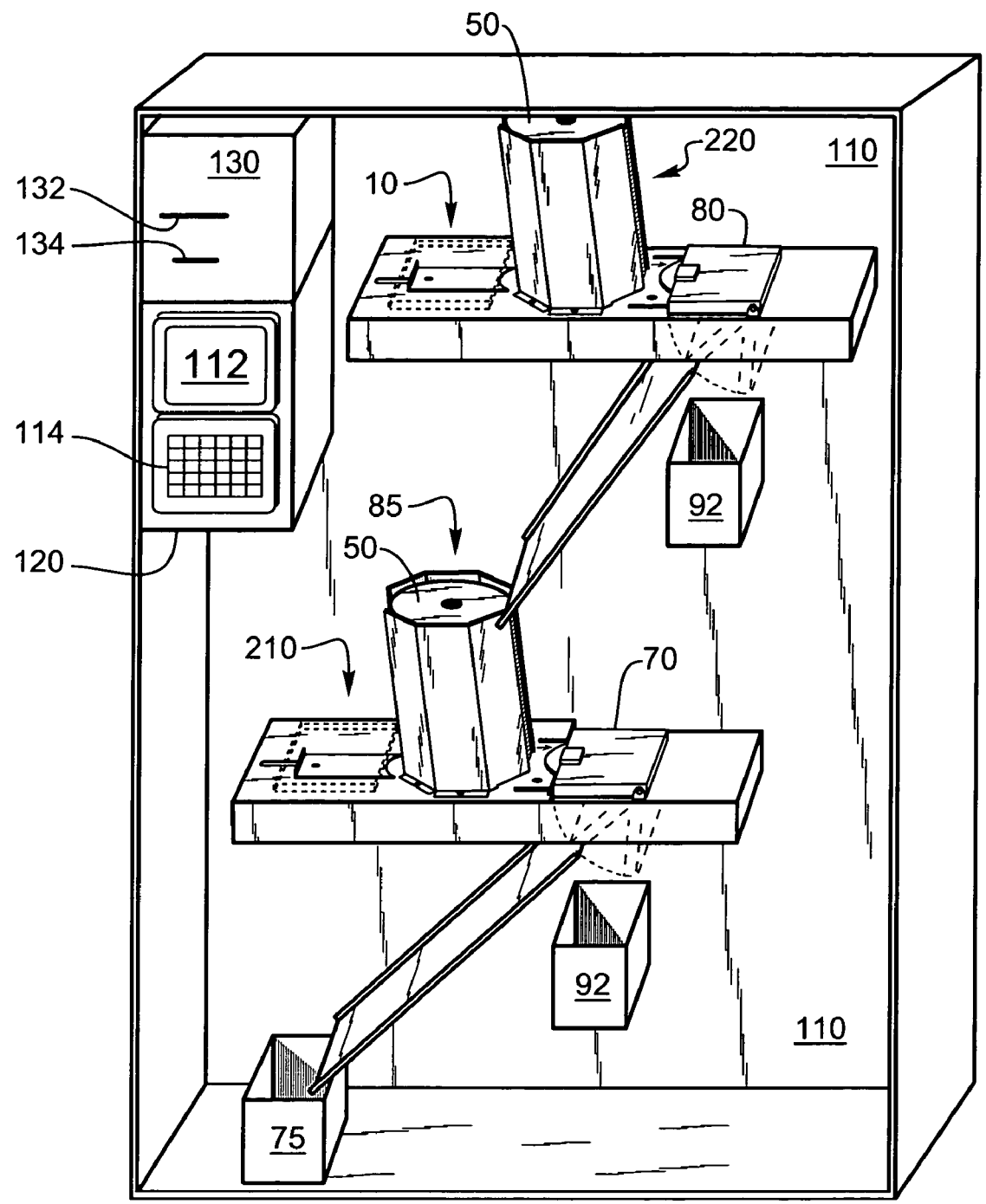
FIG. 3 is a perspective view of a two-step process for writing and printing on disks.

The workstation can be a disk writer 80, as shown in FIG. 2, with a disk insertion aperture, which accepts a disk 50 to be copied and places it on turntable 83 for rotating. A motorized disk injector-ejector mechanism 40 may be used to move disk 50 into and out of the writer 80 as is well known in the industry. When the disk is moved into the insertion aperture the motorized injector-ejector mechanism 40 places the disk 50 on the turntable 83. With the disk 50 in place on the turntable 83 the controller 55 then writes data on the disk 50 and determines if the disk 50 is defective. When writing is completed or the disk 50 is determined to be defective, the writer 80 is tilted or rotated to a disk discharge position. In FIG. 2 the writer 80 is tilted downward by cam 86 driven by motor 84 to pivot writer 80 on hinge 88 to position the writer 80 such that when the disk 50 is ejected by disk injector ejector mechanism 40 it will slide down ramp 90 to tower 85. If the disk is defective the writer 80 is tilted downward by cam 86 and the disk 50 is ejected into discard bin 92. The workstation in FIG. 2 can be a printer 70 or any other disk-processing device as seen in FIG. 3. The cam motor 84 can be controlled by controller 55, controller 555 or personal computer 500 to coordinate the tilting of the workstations, such as printers 70 and writers 80 with disk feeders 10 or 210.

Batch recording and labeling for small runs of disks 50 can be made by use of two disk feeders 10 combined with two workstations where one workstation is a writer 80 and one is a printer 70. As shown in FIG. 3 putting the number of disks 50 to be copied to and printed on in a first tower 220 on a first disk feeder 10 which feeds disks to a writer 80, which then drops the disks 50 into a tower 85 in a second disk feeder 210 for feeding disks into a printer 70. The discharged disks from the printer 70 are collected in bin 75 to complete the process. If the writer 80 is faster than the printer 70 the writer can be the first step in the process, as the written on disks will accumulate in tower 85 waiting to be printed on.

For producing a disk with writing and printing on one disk at a time such as the purchase of a copy of music on a CD or a movie on a DVD two disk feeders 10, 210 combined with two workstations such as writer 80 and printer 70 respectively can be used in a kiosk 110. The first disk feeder 10 has a tower 220 for storing multiple disks 50 and a first workstation, which as shown in FIG. 3 is writer 80, that then sends the written disk to tower 85 on second disk feeder 210 for sending the disk to printer 70. The competed disk is dropped into tower 75 and can be retrieved by a customer. When more than one copy is being purchased or copies of different CDs or DVDs are being made the same batching system as above is used. The kiosk 110 has a controller 120 having a payment-accepting portion 130 which can accept cash in slot 132 or credit card payments in slot 134. A keypad 114 in conjunction with a display 112 allows the user to order selected CDs and DVDs.

Figure 4:
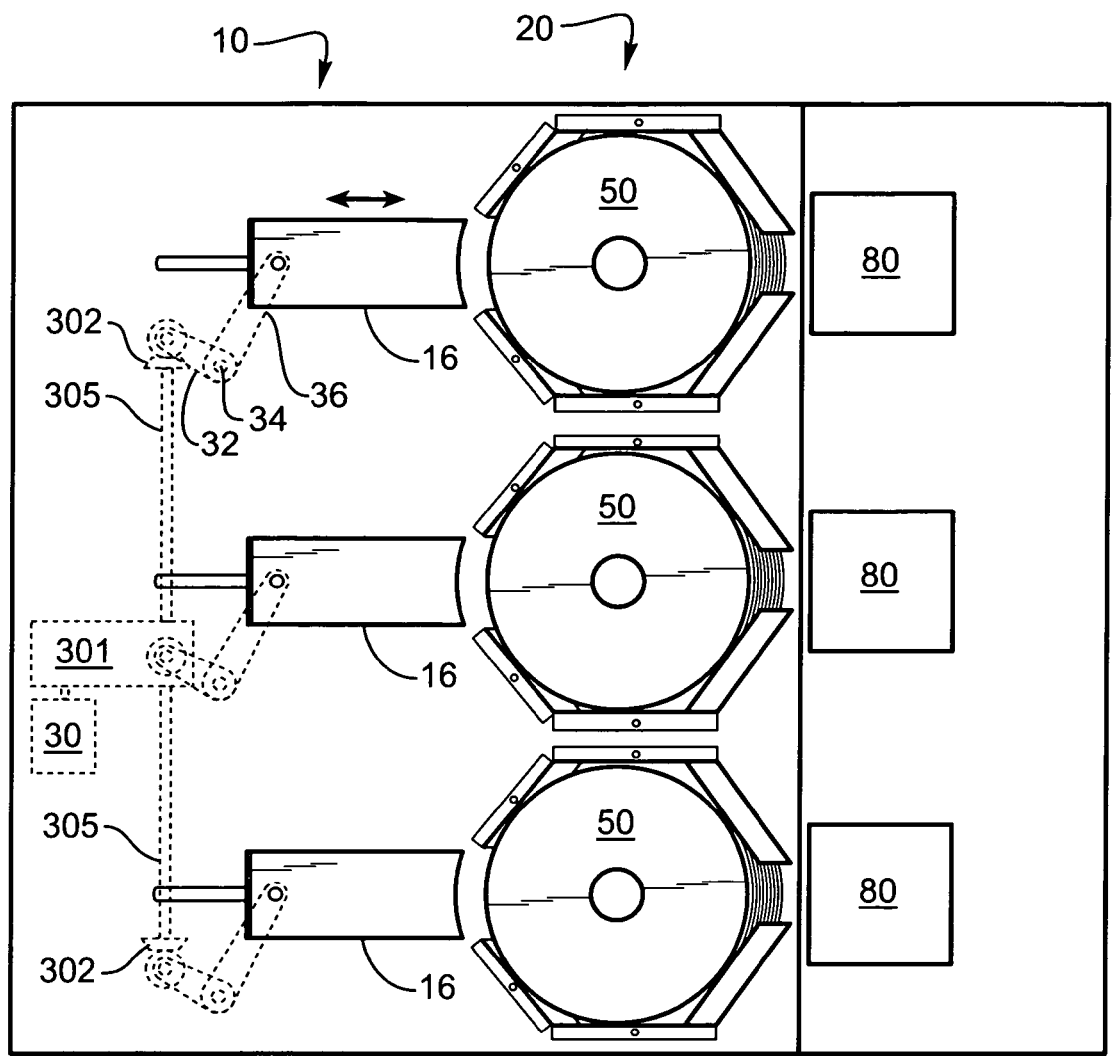
FIG. 4 is a perspective view of multiple towers and workstations with one ram motor to write on several disks for faster copying production rates.

As shown in FIG. 4 one motor 30 with a gearbox 301, a drive shaft 305 and gears 302 can provide power to turn crank arms 32, which operate through pivot 34 and piston arm 36 to drive translation nut 38 back and forth in slot 14 to drive ram 16 back and forth under the stack of disks 50 in tower 20 to push the disks one at a time into a workstation such as writer 80. Thus two or more rams 16 in disk feeders 10 may be powered by one motor 30.

The writer 80 and or the controller 55 of the disk feeder 10 may be connected to a personal computer 500 with a reader or a hard drive to provide the data to be copied and printed and for running the disk feeder, the writer and the printer. Alternatively, a reader 550 and a controller 555 may be used with the feeder 10 and workstation to make copies of a disk by using a writer 80 and a printer.

In an alternative embodiment ram 16 can be moved by a motor having a screw and a translating nut thereon for linear movement of the ram 16.

A sensor such as sensor 101 can be used to count the number of disks fed to the workstation and controller 55 can receive the sensor information to control the number of disks delivered to the workstation. Thus the disk feeder can be programmed to feed the desired number of disks to a workstation. The workstation can also communicate with the controller to ask for the next disk to be sent after the previous disk is processed.

Obviously, many modifications and variations of the present invention are possible in light of the above teachings. It is therefore to be understood that, within the scope of the appended claims, the invention may be practiced otherwise than as specifically described.

What is claimed is:

1. A disk feeder comprising,
a housing having a flat top surface,
a trough indented in the top surface of the housing,
a slot in the trough,
said top surface having a maximum first height as measured from a bottom of said trough; a ram having a width almost as wide as the trough and having a maximum second height as measured from said bottom; and a bottom disk in a stack having a maximum third height as measured from said bottom, and a ram front edge for engaging and pushing an edge of said disk, the ram width narrower than the diameter of said disk, and wherein said second height is greater than said first height and said third height is greater than said first and second heights,
the ram sliding in the trough and mechanically connected through the slot to a motor inside the housing for driving the ram back and forth,
a cover extending slightly over the top surface of the ram and connected to the top surface of the housing to enclose and guide the ram in the trough,
a tower having a first tower wall with an inwardly shaped perimeter attached to the top of the housing adjacent one side of the slot and second tower wall with an inwardly shaped perimeter attached to the top of the housing adjacent the opposite side of the trough for enclosing a stack of disks between the tower walls,
the tower walls having a gap at their nearest points, the gap extending proximate the width of the ram, for admitting the ram while blocking the disks from exiting the tower, and a second gap cut into the tower walls on one side of the tower, for extending the size of the first gap to being proximate the size of the height and width of the disks for discharging a disk from the stack one at a time,
the tower walls each having a first flange and a second flange perpendicular to the wall and parallel surface at the base of the tower for securing the tower to the top of the housing, the first flange is at the back or the tower and the second flange is at the side of the tower leaving the front of the tower open at the base for allowing disks to be pushed out from under the tower by the ram,
a workstation adjacent the tower for receiving the disks pushed out therefrom for processing the disks.

2. A disk feeder as in claim 1 wherein,
the walls have three wall sections joined at angles for surrounding the stack of disks.

3. A disk feeder as in claim 1 wherein,
the workstation comprises a pair of opposing rollers adjacent the gap at the base of the wall accepts the disk emerging from the gap in the wall between the rollers, wherein at least one roller has spikes thereon for dimpling the surface of the disk making the disk unreadable, thereby destroying the data on the disk as the disk passes between the pair of rollers.

4. A disk feeder as in claim 1 wherein,
the workstation comprises a writer adjacent the gap at the base of the wall for accepting the disks emerging therefore, the writer having a motorized disk injector-ejector mechanism.

5. A disk feeder as in claim 1 wherein,
the workstation comprises a printer adjacent the gap at the base of the wall for accepting the disks emerging therefore, the printer having a motorized disk injector-ejector mechanism.

6. A disk feeder as in claim 1 wherein,
the tower is tilted to let the stack of disks rest on the inside of the tower to reduce the weight resting on the bottom disk in the stack.

7. A disk feeder as in claim 1 wherein,
the workstation has a motorized disk injector-ejector mechanism,
a work station pivot mechanism which pivots the work station on an axis to receive disks while parallel top surface of the disk feeder and discharge disks at an angle to the top surface of the disk feeder.

8. A disk feeder as in claim 7 wherein,
a chute receives the disk ejected from the work station and guides it to a second tower for stacking the disks.

9. A disk feeder as in claim 7 wherein,
a bin located under the work station receives the ejected disk when the work station is tilted downward.

10. A disk feeder as in claim 1 wherein,
a second tower for receiving disks attached to a second disk feeder for feeding disks to a second work station for a two step processing of disks.

* * * * *